Jan. 12, 1926.  1,569,336
A. ROESCH
STUFFING BOX FOR AUTOMATIC REGULATORS AND THE LIKE
Original Filed August 9, 1921
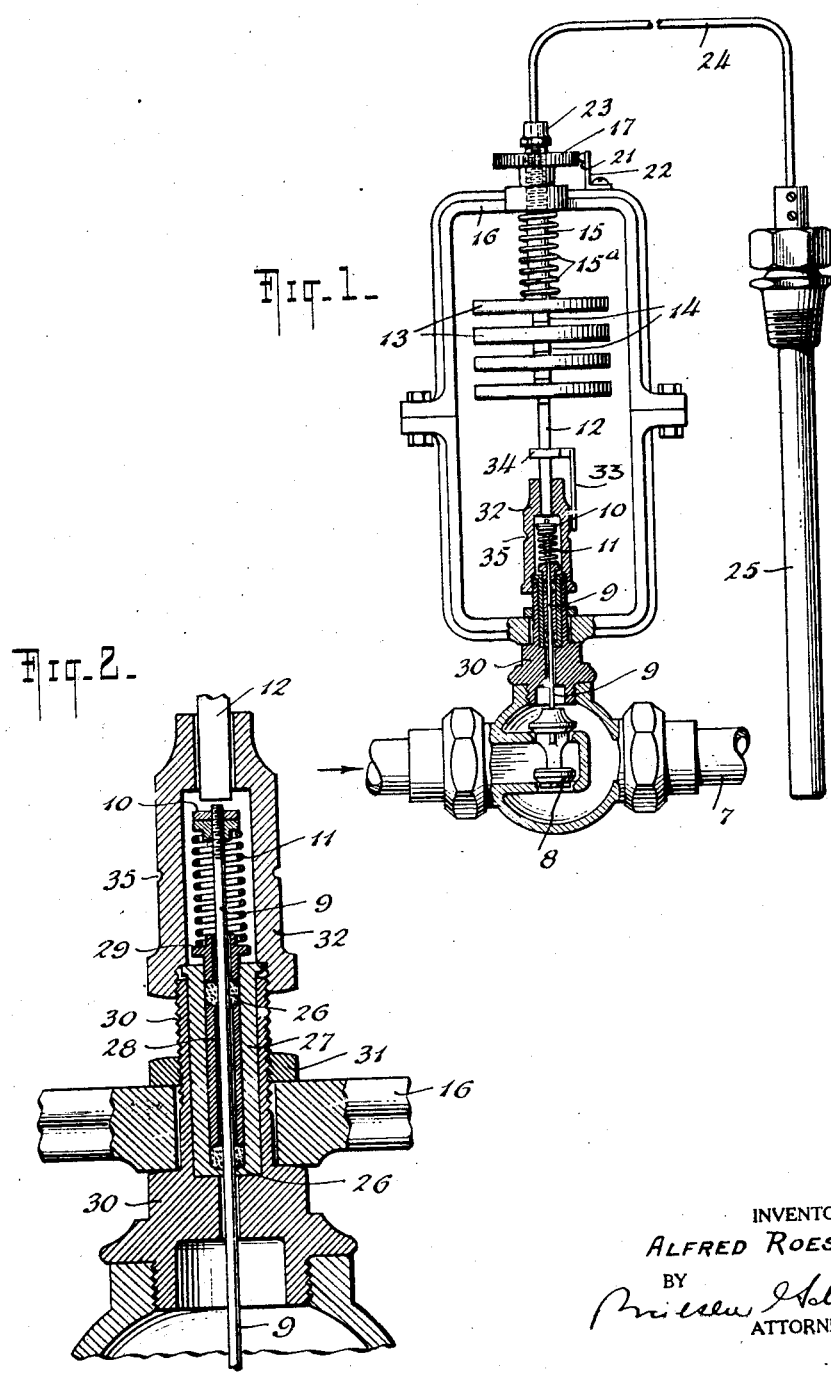
INVENTOR
ALFRED ROESCH
BY
ATTORNEYS Patented Jan. 12, 1926.

1,569,336

UNITED STATES PATENT OFFICE.

ALFRED ROESCH, DECEASED, LATE OF BROOKLYN, NEW YORK; BY EMMA ROESCH, EXECUTRIX, OF BROOKLYN, NEW YORK, ASSIGNOR TO CHARLES J. TAGLIABUE MFG. CO., OF BROOKLYN, NEW YORK, A CORPORATION OF NEW YORK.

STUFFING BOX FOR AUTOMATIC REGULATORS AND THE LIKE.

Original application filed August 9, 1921, Serial No. 491,048. Divided and this application filed June 6, 1924. Serial No. 718,238.

*To all whom it may concern:*

Be it known that ALFRED ROESCH, deceased, late a citizen of the United States, and resident of the borough of Brooklyn, county of Kings, city and State of New York, has invented certain new and useful Improvements in Stuffing Boxes for Automatic Regulators and the like, of which the following is a specification.

The invention relates to stuffing boxes and more particularly to stuffing boxes for regulators whereby temperatures or pressures are automatically regulated in accordance with predetermined programs or plans. The object of this invention is to provide a stuffing box of efficient and simple construction in which the elements are capable of adjustment to provide a tight connection without interfering with the operation of the instrumentalities with which said stuffing box is operatively combined. The invention will be fully described hereinafter and the features of novelty will be pointed out in the claims. The present application is a division of another application filed by him on August 9, 1921, Serial No. 491,048.

In the accompanying drawings, which show an example of the invention and of its application without defining the limits of the invention itself or of its field of usefulness, Fig. 1 is an elevation partly in section showing the stuffing box operatively combined with a thermo-sensitive regulator; and Fig. 2 is an enlarged detail sectional elevation of the stuffing box.

In the illustrated example 7 represents a pipe intended to exemplify a conduit for steam or other medium and controlled by a valve 8 of any suitable type. The valve 8 is carried by a vertically movable stem 9, having its upper end screw-threaded for the accommodation of an adjusting nut 10 which constitutes an adjustable abutment for one end of a spring 11; the latter, when free to do so, as will appear more fully hereinafter, serves to actuate the stem 9 upwardly and thereby keeps valve 8 open, the upward travel of the stem 9 in such case being limited, in any customary manner. The stem 9 is further arranged to be operated in a downward direction by a rod 12 which, as shown, may be operatively connected with a battery of capsular springs 13 or constitute a part of any other suitable instrumentality. The springs 13, if used, may be connected with each other by means of tubes 14 and represent an example of the means whereby the valve 8 is automatically actuated. The upper one of said battery of capsular springs 13 may be attached to a hollow stud 15 which passes through a suitable opening in the upper portion of a bracket or support 16, said stud 15 being threaded at its upper end for the accommodation of an adjusting disc 17. A spring $15^a$ which surrounds the stud 15 below the bracket 16 and with one end engages the same and with its other end engages the upper capsular spring 13, keeps the series of capsular springs 13 and the rod 12 pushed downwardly as far as permitted by the adjusting disc 17 the downward movement of which is arrested by the bracket 16. A nut 23 acts as a stop to prevent the adjusting disc 17 from being entirely unscrewed from the stud 15. The diaphragms of the capsular springs 13 are constructed of spring-tempered material so that each capsular spring possesses an inherent elasticity tending to return it to its normal condition or, in other words to collapse it. As stated, the lower terminal capsular spring 13 is connected with the rod 12 while the other terminal capsular spring 13 is connected in the present instance with capillary tubing 24 leading to the sensitive member or bulb 25 which contains a suitable volatile fluid in the usual way. The sensitive member 25 is always located so as to be susceptible to and directly influenced by the temperature or other conditions at the point where regulation is desired and in the case of pressure regulation is replaced by a suitable device or element located in such case so as to be within the zone of the pressure which is to be regulated.

In an apparatus of the illustrated type the valve 8 is set to produce the predetermined result which is desired and said valve 8 is automatically closed or opened beyond this set point by the action of the capsular springs 13 or their equivalent to compensate for variations from this result and said valve is always returned to its set position after each variation. In this way regulation is carried out in accordance with the predetermined plan.

The battery of capsular springs 13 provides the necessary range of movement to operate the valve 8 within its limits of adjustment and may be increased or diminished in number to meet the requirements of each case; said battery of springs 13 may also be replaced by other actuating means suitable to the character of particular installation.

To secure the most efficient operation from a device of this kind it is essential that the friction of the moving parts be reduced to a minimum and the present construction accordingly includes a novel method of packing the valve stem 9 whereby it is enabled to move freely between two or more valve packings and thus avoid the friction resulting ordinarily from a bearing contact between metal parts. A preferred arrangement is shown in detail by Fig. 2 which also shows how friction is further reduced by the use of a smaller valve stem (made possible by widely spaced bearing surfaces) and how said stem is protected from damage. In the illustrated example 26 indicates two valve stem packings of suitable material between which the stem 9 slides, said packings being located in the gland 27 and the lower packing 26 being secured in place therein by a follower 28 while the upper packing 26 is maintained in position by a follower 29. An extension 30 of the valve-bonnet surrounds the gland 27, a lock-nut 31 serving to operatively connect said bonnet with the bracket 16; the gland 27 in turn is secured within the extension 30 by means of a sleeve 32 which is in screw-threaded engagement with extension 30, said sleeve 32 also serving to protect from outside damage that portion of the valve-stem 9 which projects beyond the gland 27. The proper compression of the packings 26 is maintained by the spring 11 which has its one end in engagement with the follower 29 and which, in addition to lifting valve stem 9, also serves the purpose of always keeping said packings 26 under the required pressure, thus, at all times preventing leakage of the steam past the packings without undue pressure of the packings against the valve stem.

Another novel feature of the present invention comprises an indicator 33 mounted upon the rod 12 by means of collar 34 and which, consequently, travels up and down with the movement of rod 12 and, therefore, also with movement of valve stem 9, thus indicating the extent to which valve 8 is closed; the condition of the valve is indicated by the tip of said pointer 33 which registers with a suitable mark 35 on the sleeve 32 when the valve is fully closed or if valve 8 is only partly closed by the distance between said tip of the pointer 33 and the mark 35.

The stuffing box may be used with equal efficiency in connection with other mechanical elements whereby a moving part is to be packed in a manner to avoid interference with its operation. The invention is particularly useful in automatic regulators where any clamping action exerted by the stuffing box or packing would disturb the adjustment for which the apparatus is set and consequently would interfere with its operation. In the present construction the pressure of the packing upon the valve stem or its equivalent is always constant and is always such as to provide a fluid-tight joint without binding the stem.

Various changes in the form shown and described may be made within the scope of the claims without departing from the spirit of the invention.

What is claimed is:

1. The combination of a valve casing, a tubular extension thereon, a valve in said casing, a valve stem carrying said valve and extending lengthwise of and beyond said extension, a plurality of packings within said extension for said stem, means partly within and partly outside of said extension engaging one of said packings and a spring located exteriorly of said extension whereby a pressure is exerted on said means and transmitted to said packings to compress same.

2. The combination of a valve casing, a tubular extension thereon, a valve in said casing, a valve stem carrying said valve and extending lengthwise of and beyond said extension, a projection on said stem exteriorly of said extension, a tubular follower slidably mounted on said stem within said extension, packings surrounding said stem at opposite ends of said follower, an outer follower slidably mounted on said stem and engaging one of said packings and a spring having its one end in engagement with the projection on said valve stem and its other end in contact with said outer follower whereby pressure is transmitted to said packings by said followers to compress said packings.

3. The combination of a valve casing including a bonnet, a tubular extension on said bonnet, a tubular gland extending into said extension, a sleeve connected with said extension and engaging said gland to fix it in position, a plurality of packings spaced apart within said gland in the direction of its axis, means for maintaining said packings in said spaced relation to each other, a follower extending into said gland and engaging one of said packings, a valve in said casing, a valve stem carrying the same and extending through said packings and follower into said sleeve, an adjustable abutment on said stem and a spring engaging said abutment and said follower whereby said valve is normally moved to an open position and pressure is exerted upon said follower and transmitted thereby to said packings and spacing means to maintain said packings in engagement with said stem.

4. The combination of a movable member a projection carried thereby, a plurality of packings therefor spaced apart in the direction of the axis of said member, means on said member whereby said packings are maintained in spaced relation, an outer follower on said member and a spring having its one end in engagement with said outer follower and its other end in contact with the projection on said movable member whereby pressure is exerted upon the outer follower and transmitted thereby to said packings and spacing means to maintain said packings in engagement with said member.

5. The combination of a reciprocating member a projection adjustably carried thereby, a plurality of packings for said member spaced apart in the direction of its axis, a tubular follower upon said member between said packings, an outer follower on said member and a spring having its one end in engagement with said outer follower and its other end in contact with the projection on said reciprocating member whereby pressure is exerted upon the said outer follower and transmitted thereby to said packings and tubular follower to maintain said packings in engagement with said member.

In testimony whereof I have hereunto set my hand.

EMMA ROESCH,
*Executrix of the Last Will and Testament of Alfred Roesch, Deceased.*